US012615546B2

(12) United States Patent
Han et al.

(10) Patent No.: US 12,615,546 B2
(45) Date of Patent: Apr. 28, 2026

(54) METHOD AND APPARATUS OF REPORTING BUFFER STATUS

(71) Applicant: Lenovo (Beijing) Limited, Beijing (CN)

(72) Inventors: Jing Han, Beijing (CN); Yibin Zhuo, Beijing (CN); Mingzeng Dai, Shanghai (CN); Lianhai Wu, Beijing (CN); Congchi Zhang, Shanghai (CN); Haiyan Luo, Shangai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 78 days.

(21) Appl. No.: 18/719,557

(22) PCT Filed: Dec. 14, 2021

(86) PCT No.: PCT/CN2021/137883
§ 371 (c)(1),
(2) Date: Jun. 13, 2024

(87) PCT Pub. No.: WO2023/108413
PCT Pub. Date: Jun. 22, 2023

(65) Prior Publication Data
US 2025/0048173 A1 Feb. 6, 2025

(51) Int. Cl.
H04W 28/02 (2009.01)
(52) U.S. Cl.
CPC ... H04W 28/0278 (2013.01); H04W 28/0268 (2013.01)

(58) Field of Classification Search
CPC ...................... H04W 28/0278; H04W 28/0268
USPC .......................................................... 709/238
See application file for complete search history.

(56) References Cited

U.S. PATENT DOCUMENTS

| | | | | |
|---|---|---|---|---|
| 9,439,211 | B2* | 9/2016 | Feuersaenger | ........ H04W 72/21 |
| 2016/0135155 | A1* | 5/2016 | Al-Shalash | ........... H04W 72/21 |
| | | | | 370/329 |
| 2017/0245171 | A1* | 8/2017 | Jung | ................... H04L 43/0852 |
| 2021/0377786 | A1 | 12/2021 | Lee et al. | |

FOREIGN PATENT DOCUMENTS

WO 2020116820 A1 6/2020

OTHER PUBLICATIONS

3rd Generation Partnership Proje , "Discussion on enhancements for XR", 3GPP TSG-RAN WG1 Meeting #106e, Tdoc R1-2107631, Aug. 16, 2021, 5 pages.

(Continued)

*Primary Examiner* — Adil Ocak
(74) *Attorney, Agent, or Firm* — FIG. 1 Patents

(57) ABSTRACT

Embodiments of the present application relate to a method and apparatus of reporting buffer status. An exemplary UE includes: at least one receiving circuitry; at least one transmitting circuitry; and at least one processor coupled to the at least one receiving circuitry and the at least one transmitting circuitry, wherein the at least one processor is configured to: trigger a buffer status report (BSR) in response to a trigger condition associated with an application data unit (ADU) being satisfied; and generate buffer status information for the BSR.

20 Claims, 10 Drawing Sheets

301 trigger a BSR in response to a trigger condition associated with an ADU being satisfied

303 generate buffer status information for the BSR

(56)             References Cited

OTHER PUBLICATIONS

3rd Generation Partnership Proje , "Discussion on enhancements for XR", 3GPP TSG-RAN WG1 Meeting #107-e, Tdoc R1-2111787, Nov. 11, 2021, 8 pages.

3rd Generation Partnership Proje , "Moderator's Summary on [RAN94e-R18Prep-11] Enhancements for XR", 3GPP TSG RAN#94e RP-212671, Dec. 6, 2021, 54 pages.

PCT/CN2021/137883 , "International Search Report and Written Opinion", International Application No. PCT/CN2021/137883, Aug. 31, 2022, 7 pages.

* cited by examiner

| 1 Bit | | | | | | | |
|---|---|---|---|---|---|---|---|

| LCG ID | Buffer Size of LCG | Oct 1 |
|---|---|---|
| ADU index | Buffer Size of ADU | Oct 2 |

<u>1300</u>

METHOD AND APPARATUS OF REPORTING BUFFER STATUS

TECHNICAL FIELD

Embodiments of the present application are related to wireless communication technology, especially, related to a method and apparatus of reporting buffer status, e.g., for extended reality (XR) services.

BACKGROUND OF THE INVENTION

XR refers to all real-and-virtual combined environments and human-machine interactions generated by computer technology and wearable technology. As an umbrella term for different types of realities, XR includes virtual reality (VR), augmented reality (AR) and mixed reality (MR) etc., representative forms and the areas interpolated among them. The levels of virtuality range from partially sensory inputs to fully immersive VR. A key aspect of XR is the extension of human experiences especially relating to the senses of existence, e.g., VR and the acquisition of cognition, e.g., AR.

$3^{rd}$ generation partnership program (3GPP) has considered introducing XR into 3GPP, and the integration of XR applications within 5G system (5GS) is approached following the model of 5G media streaming as defined in 3GPP. Thus, there are a mass of technical problems to be solved to support XR services (or applications, or traffics) in 5GS or in further long-term evolution (LTE) of radio access network (RAN). For example, one technical problem to be solved concerns on the buffer status report (BSR) for XR services.

SUMMARY

One objective of the embodiments of the present application is to provide a technical solution for wireless communication, especially, a technical solution of reporting buffer status for XR services, so that the network side can schedule a suitable uplink (UL) grant size for the XR data to be transmitted.

Some embodiments of the present application provide a user equipment (UE), which includes: at least one receiving circuitry; at least one transmitting circuitry; and at least one processor coupled to the at least one receiving circuitry and the at least one transmitting circuitry. The at least one processor is configured to: trigger a BSR in response to a trigger condition associated with an application data unit (ADU) being satisfied; and generate buffer status information for the BSR.

Some other embodiments of the present application provide a method, which includes: triggering a BSR in response to a trigger condition associated with an ADU being satisfied; and generating buffer status information for the BSR.

In some embodiments of the present application, data of the ADU are configured to a logic channel group (LCG), and the ADU is associated with at least one logical channel which belongs to the LCG. According to some embodiments of the present application, the trigger condition is satisfied in the case that: UL data belonging to the ADU becomes available to a media access control (MAC) entity, and a) the UL data belongs to a logical channel with higher priority than that of any logical channel containing available UL data which belong to the ADU of the LCG; or b) the UL data belongs to a logical channel with higher priority than that of any logical channel containing available UL data which belong to any ADU of the LCG; or c) the UL data belongs to a logical channel with higher priority than that of any logical channel containing available UL data which belong to any ADU of any LCG; or d) the UL data belongs to a logical channel with higher priority than a configured threshold associated with priority; or e) the UL data has higher priority or higher importance than that of any other available UL data belongs to the ADU in the LCG; or f) the UL data has higher priority or higher importance than that of any other available UL data belongs to any ADU in the LCG; or g) the UL data has higher priority or higher importance than that of any other available UL data belongs to any ADU in any LCG; or h) the UL data has higher priority than a configured threshold associated with priority; or i) the UL data has higher importance than a configured threshold associated with importance; or j) the ADU has higher priority than that of any ADU containing available UL data which belong to the LCG; or k) the ADU has higher priority than that of any ADU containing available UL data which belong to any LCG; or l) the ADU has higher priority than a configured threshold associated with priority; or m) data size of the UL data is larger than a configured threshold associated with buffer size; or n) buffer size of the ADU that available to the MAC entity is larger than a configured threshold associated with buffer size. According to some other embodiments of the present application, the trigger condition is satisfied in the case that: UL data belonging to the ADU becomes available to an MAC entity, and a) none of logical channel(s) which belongs to the LCG contains any available UL data for the ADU, or b) none of logical channel(s) which belongs to the LCG contains any available UL data.

In some embodiments of the present application, LCG configuration is independent from the ADU. According to some embodiments of the present application, the trigger condition is satisfied in the case that: UL data, belonging to the ADU and associated with a logical channel, becomes available to an MAC entity; and a) the logical channel has higher priority than that of any logical channel containing available UL data which belong to any ADU; or b) the logical channel has higher priority than that of any logical channel containing available UL data which belong to the ADU; or c) the logical channel has higher priority than a configured threshold associated with priority; or d) the UL data has higher priority or higher importance than that of any other available UL data belongs to the ADU; or e) the UL data has higher priority or higher importance than that of any other available UL data belongs to any ADU; or f) the UL data has higher priority than a configured threshold associated with priority; or g) the UL data has higher importance than a configured threshold associated with importance; or h) the ADU has higher priority than that of any ADU containing available UL data; or i) the ADU has higher priority than a configured threshold associated with priority; or j) data size of the UL data is larger than a configured threshold associated with buffer size; or k) buffer size of the ADU available to the MAC entity is larger than a configured threshold associated with buffer size. According to some other embodiments of the present application, the trigger condition is satisfied in the case that: UL data, belonging to the ADU and associated with a logical channel, becomes available to an MAC entity; and a) none of logical channel(s) which belongs to the ADU contains any available UL data of the ADU; or b) none of logical channel(s) contains any available UL data.

In some embodiments of the present application, the trigger condition is satisfied in the case that a timer associated with the ADU expires and no BSR contains left data in a buffer of the ADU. According to some embodiments of the present application, length of the timer is configured by network side or is set based on delay budget of the ADU. According to some embodiments of the present application, the timer is started in response to that first data of the ADU becomes available to an MAC entity, and the timer is stopped in response to that last data of the ADU has been transmitted.

In some embodiments of the present application, the BSR is a legacy BSR or an ADU associated BSR containing ADU buffer status information.

In some embodiments of the present application, in the case that the BSR is an ADU associated BSR containing ADU buffer status information based on each of at least one of LCG and there are one or more ADUs associated with each LCG, buffer status information of the one or more ADUs is included in BSR MAC CE for transmission of the BSR.

In some embodiments of the present application, in the case that the BSR is an ADU associated BSR containing ADU buffer status information based on a LCG and there are one or more ADUs associated with the LCG, only buffer status information of the ADU is included in BSR MAC CE for transmission of the BSR.

In some embodiments of the present application, index of each LCG associated with each ADU whose buffer status information is included in the BSR MAC CE is included the BSR MAC CE.

In some embodiments of the present application, the BSR is an ADU associated BSR containing ADU buffer status information based on an ADU, and only buffer status information of the ADU is included in BSR MAC control element (CE) for transmission of the BSR.

In some embodiments of the present application, the BSR is an ADU associated BSR containing ADU buffer status information based on each ADU of at least one ADU, buffer status information of the at least one ADU is included in BSR MAC CE for transmission of the BSR.

In some embodiments of the present application, index of each ADU whose buffer status information is included in BSR MAC CE for transmission of the BSR is included the BSR MAC CE.

In some embodiments of the present application, BSR MAC CE for transmission of the ADU associated BSR is separate from that for transmission of a legacy BSR.

In some embodiments of the present application, the at least one processor is configured to: calculate data volume for the ADU to generate the buffer status information of the ADU in radio link control (RLC) layer and packet data convergence protocol (PDCP) layer. According to some embodiments of the present application, in the case that data for the ADU are mapped to a plurality of logical channels, the data volume of the ADU is calculated based on the plurality of logical channels in MAC layer.

Given the above, embodiments of the present application propose a novel BSR solution for XR service, which will facilitate the integration of XR services into 5GS or further long-term evolution of RAN.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE, and so on. It is contemplated that along with the developments of network architectures and new service scenarios, all embodiments in the present application are also applicable to similar technical problems. Moreover, the terminologies recited in the present application may change, which should not affect the principle of the present application.

Figure 1:
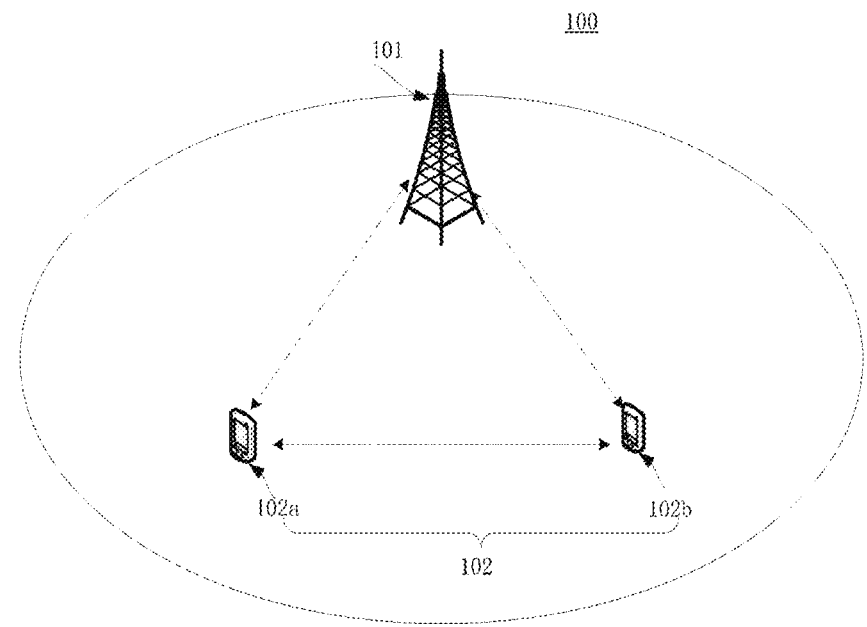
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes at least one base station (BS) 101 and at least one UE 102. In particular, the wireless communication system 100 includes one BS 101 and two UE 102 (e.g., a first UE 102*a* and a second UE 102*b*) for illustrative purpose. Although a specific number of BSs and UEs are illustrated in FIG. 1 for simplicity, it is contemplated that the wireless communication system 100 may include more or less BSs and UEs in some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may communicate with a core network (CN) node (not shown), e.g., a mobility management entity (MME) or a serving gateway (S-GW), a mobility management function (AMF) or a user plane function (UPF) etc. via an interface. A BS also be referred to as an access point, an access terminal, a base, a macro cell, a node-B, an enhanced node B (eNB), a gNB, a home node-B, a relay node, or a device, or described using other terminology used in the art. In 5G NR, a BS may also refer to as a RAN node or network apparatus. Each BS may serve a number of UE(s) within a serving area, for example, a cell or a cell sector via a wireless communication link. Neighbor BSs may communicate with each other as necessary, e.g., during a handover procedure for a UE.

The UE 102, e.g., the first UE 102*a* and second UE 102*b* should be understood as any type terminal device, which may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
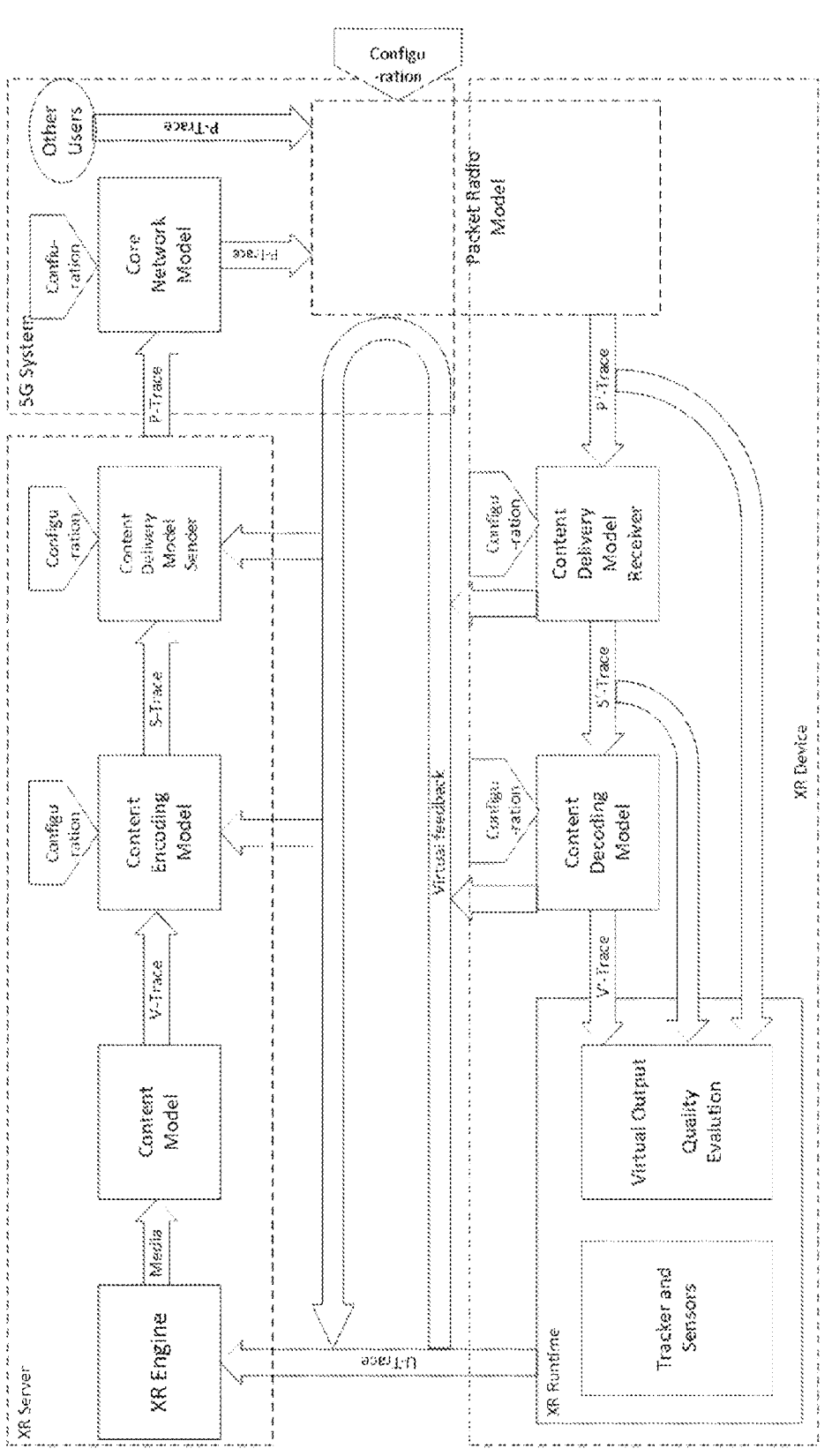
FIG. 2 is a schematic diagram of an end-to-end modelling of XR services provided in TR 26.926.

During the evolution, 3GPP plans to integrate XR applications into 5GS following the model of 5G media streaming, e.g., an end-to-end modelling of XR services provided in TR 26.926 as shown in FIG. 2.

Referring to FIG. 2, the end-to-end modelling of XR services provided in TR 26.926 provides a general architecture and system model for XR traffic. In an XR server, e.g., a UE, data of XR services are processed by several entities before entering 5GS. For example, media is processed to be V-Trace(s) through the content model, then to be S-trace(s) through the content encoding model, then to be P-trace(s) through the content delivery model sender, and then is conveyed to 5GS, e.g., to the core network model of 5GS. An XR device, e.g., another UE may obtain the XR services from 5GS.

Regarding V-Traces, they provide a time series of the statistics/complexity of a video frame. V-Traces are expected to provide sufficient information such that a coding model, e.g., the content encoding model shown in FIG. 2 can create suitable statistics statics for encoded video streams at the output. Regarding S-Traces, they provide a time series of encoded video ADUs, referred to as slices as known from H.264/advanced video coding (AVC) and H.265/high efficiency video coding (HEVC) suitable ADUs as outputs from a video codec. S-Traces are expected to provide sufficient information to a content delivery module, e.g., the content delivery model sender shown in FIG. 2 to create internet protocol (IP) packets. Regarding P-Traces, they provide a time series of IP packets, possibly associated with different application flows and/or quality of service (QoS) flows. IP packets of a P-Trace that are conveyed to 5GS, may belong to the same ADU, be mapped to the same QoS flow or different QoS flows in 5GS, be mapped to the same or different data radio bearers (DRB)s, and thus be mapped to the same or different logical channels. In addition, P-Traces provide metadata information that may be beneficial for advanced delivery.

An ADU can be a frame, a group of pictures (GoP), a slice, a trace, a file, a code block etc. There are various types of GOPs, such as intra-coded pictures (also referred to as "I-frame"), predictive coded pictures (also referred to as "P-frame"), B-predictive coded pictures (also referred to "B-frame"). Encoders use groups of pictures and other tools to render smoothly streaming video. Frame rates and other metrics may also be applied. Depending on the encoding mechanisms, frames in the same ADU (e.g., in the same GoP) may be correlated to each other. Thus, when IP packets for XR services belongs to the same ADU, since they are correlated with each other, end-user performance depends on whether all these IP packets are successfully delivered. For instance, if the I-frame is lost, users will not be able to decode the subsequent P-frame and B-frame.

However, in 5GS, these IP packets will be treated as if they are uncorrelated with each other, which will cause performance degradation. Meanwhile, due to the nature of wireless communication, packet loss may happen in the UL and/or downlink (DL) transmission, which will cause performance degradation.

According to embodiments of the present application, at least to reduce performance degradation of XR services, providing assistance information of buffer status of the same ADU is beneficial for the network side, e.g., a gNB to schedule a suitable UL grant size to schedule the IP packets of the same ADU as a whole. However, 3GPP provides legacy BSR without considering ADU, and thus how to report such a BSR associated with XR services is a brand new technical problem and should be further solved, which further involves the technical problems concerning on how to trigger BSR when considering XR services, how to calculate data volume of an ADU for such a BSR when considering XR services, and how to transmit the BSR when considering XR services, e.g., the format of MAC CE for transmission of such a BSR etc.

Figure 3:
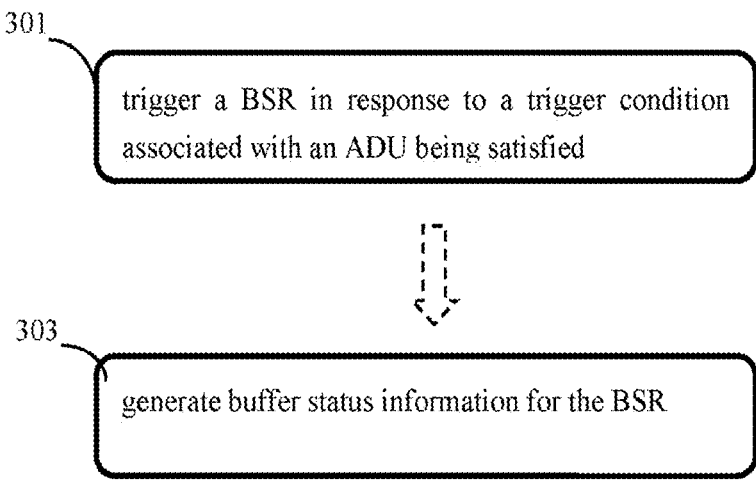
FIG. 3 is a flow chart illustrating an exemplary procedure of a method of reporting buffer status according to some embodiments of the present application.

FIG. 3 is a flow chart illustrating an exemplary procedure of a method of reporting buffer status according to some embodiments of the present application.

As shown in FIG. 3, when XR services are supported in UE, e.g., UE 102 as shown in FIG. 1, a BSR may be triggered in response to a trigger condition associated with an ADU being satisfied in step 301. An ADU can be a frame, a GoP, a slice, a trace, a file, a code block etc. Data (or UL data) of an ADU, e.g., IP packets of a P-Trace that are conveyed to 5GS and belong to the same ADU, may be mapped to the same logical channel or different logical channels. When LCG configuration is provided where a LCG is configured to includes one or more logical channels, the different logical channels belong to the same LCG or different LCGs.

According to some embodiments of the present application, ADU and LCG configuration are correlated. For example, data of the same ADU are configured to the same LCG, and the ADU is associated with at least one logical channel which belongs to the LCG (Hereafter, "Scheme 1").

Figure 4:
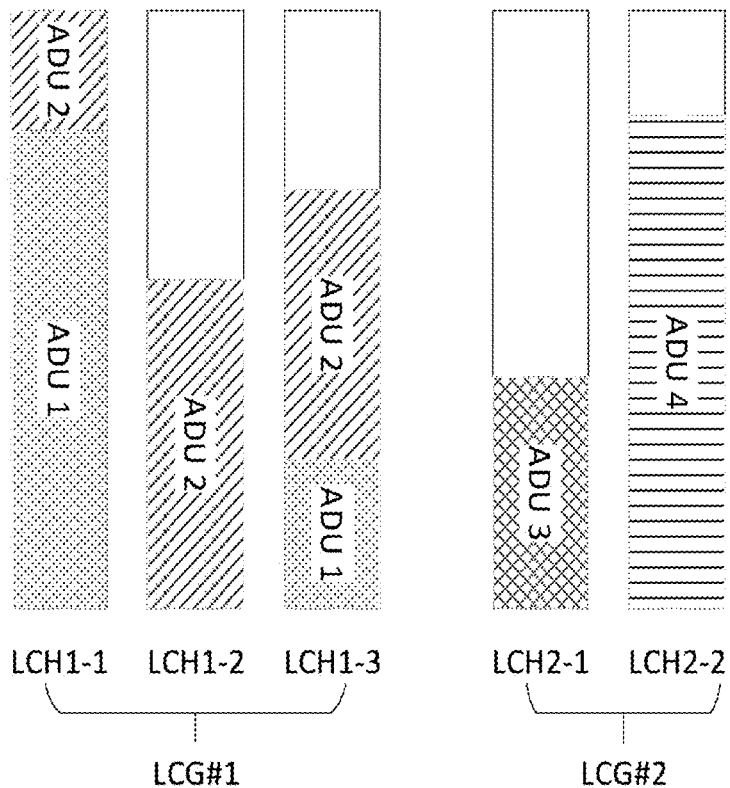
FIG. 4 is a schematic diagram of exemplary IP packets of XR services conveyed to 5GS under Scheme 1 according to some embodiments of the present application.

FIG. 4 illustrates a schematic diagram of exemplary IP packets of XR services conveyed to 5GS under Scheme 1 according to some embodiments of the present application.

As shown in FIG. 4, there are a plurality of ADUs, e.g., ADU1, ADU2, ADU3 and ADU4, and two LCGs, e.g., LCG #1 and LCG #2. Each LCG is configured to include a plurality of logical channels. For example, LCG #1 includes three logical channels (LCH) s, e.g., LCH1-1, LCH1-2 and LCH1-3; and LCG #2 includes two logical channels, e.g., LCH2-1 and LCH2-2. According to Scheme 1, data of each ADU are respectively mapped to at least one logical channel belonging to the same LCG. Specifically, data of ADU1 are mapped to LCH1-1 and LCH1-3, which both belong to LCG #1; data of ADU2 are mapped to LCH1-1, LCH1-2 and LCH1-3, which all belong to LCG #1; data of ADU3 are mapped to LCH2-1 belonging to LCG #2; and data of ADU4 are mapped to LCH2-2 belonging to LCG #2.

According to some other embodiments of the present application, LCG configuration is independent from the ADU (Hereafter, "Scheme 2"), and thus data of the same ADU may be mapped to at least one channel without considering the LCG configuration, which may belong to the same LCG or different LCGs.

Figure 5:
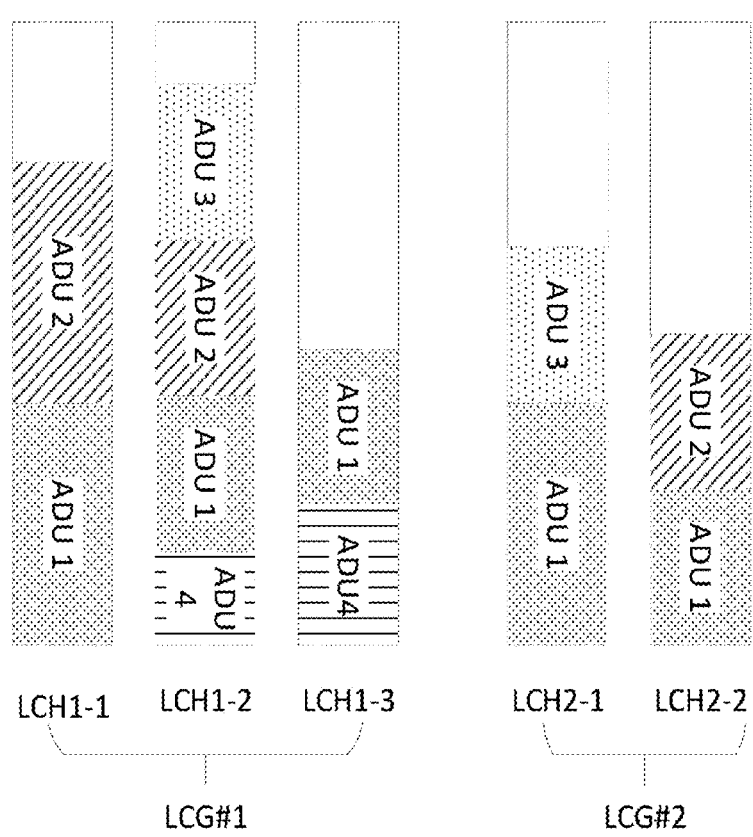
FIG. 5 is a schematic diagram of exemplary IP packets of XR services conveyed to 5GS under Scheme 2 according to some embodiments of the present application.

FIG. 5 illustrates a schematic diagram of exemplary IP packets of XR services conveyed to 5GS under Scheme 2 according to some embodiments of the present application.

Similar to FIG. 4, in FIG. 5, there are a plurality of ADUs, e.g., ADU1, ADU2, ADU3 and ADU4, and two LCGs, e.g., LCG #1 and LCG #2. Each LCG is configured to include a plurality of logical channels. For example, LCG #1 includes three logical channels, e.g., LCH1-1, LCH1-2 and LCH1-3; and LCG #2 includes two logical channels, e.g., LCH2-1 and LCH2-2. According to Scheme 2, data of each ADU are respectively mapped to at least one logical channel in a manner independent from LCG configuration. Specifically, data of ADU1 are mapped to LCH1-1, LCH1-2 and LCH1-3 belonging to LCG #1 and also mapped to LCH2-1 and LCH 2-2 belonging to LCG #2. Data of ADU2 are mapped to LCH1-1 and LCH1-2 belonging to LCG #1 and also mapped to LCH 2-2 belonging to LCG #2. Data of ADU3 are mapped to LCH1-2 belonging to LCG #1 and LCH2-1 belonging to LCG #2. Data of ADU4 are mapped to LCH1-2 and LCH1-3 belonging to LCG #1. In conclusion, data of ADU1, ADU2 and ADU3 are respectively mapped to different LCGs, while data of ADU4 are mapped to the same LCG.

Regarding whether the trigger condition associated with an ADU being satisfied, it can be determined in various manners.

For example, in the case that data of the ADU are mapped to the same LCG, and the ADU is associated with at least one logical channel which belongs to the LCG (i.e., under "Scheme 1"), various exemplary trigger conditions being satisfied are provided as follows under the premise that the UL data of an ADU (or UL data belonging to an ADU), e.g., an IP packet belongs to the ADU becomes available to an MAC entity.

In some scenarios considering Scheme 1, whether the trigger condition is satisfied is determined based on the priority of the logical channel to which the UL data belongs. According to some embodiments of the present application, the trigger condition is satisfied in the case that: the UL data belongs to a logical channel with higher priority than that of any logical channel containing available UL data which belong to the ADU of the LCG. Taking UL data of ADU1 in FIG. 4 as an example, when UL data of ADU1 belonging to LCH1-3 becomes available to the MAC entity, LCH1-1 has contained available UL data of ADU1. If LCH1-3 has a higher priority than LCH1-1, the trigger condition will be satisfied. According to some other embodiments of the present application, the trigger condition is satisfied in the case that: the UL data belongs to a logical channel with higher priority than that of any logical channel containing available UL data which belong to any ADU of the LCG.

Still taking UL data of ADU1 in FIG. 4 as an example, when UL data of ADU1 belonging to LCH1-3 becomes available to the MAC entity, LCH1-1 has contained available UL data of ADU1 and LCH1-2 has contained available UL data of ADU2. If LCH1-3 has a higher priority than LCH1-1 and LCH1-2, then the trigger condition will be satisfied. According to some yet other embodiments of the present application, the trigger condition is satisfied in the case that: the UL data belongs to a logical channel with higher priority than that of any logical channel containing available UL data which belong to any ADU of any LCG. Still taking UL data of ADU1 in FIG. 4 as an example, if UL data of ADU1 belonging to LCH1-3 becomes available to the MAC entity, LCH1-1 has contained available UL data of ADU1 and LCH2-1 has contained available UL data of ADU3. If LCH1-3 has a higher priority than LCH1-1 and 2-1, then the trigger condition will be satisfied. According to some yet other embodiments of the present application, the trigger condition is satisfied in the case that: the UL data belongs to a logical channel with higher priority than a configured threshold associated with priority. Such a threshold associated with priority can be configured by radio resource control (RRC) or MAC CE etc., higher layer signaling.

In some scenarios considering Scheme 1, whether the trigger condition is satisfied is determined based on the priority or importance of the UL data of an ADU itself. According to some embodiments of the present application, the trigger condition is satisfied in the case that: the UL data has higher priority or higher importance than that of any other available UL data belongs to the ADU in the LCG. Taking UL data of ADU1 in FIG. 4 as an example, when UL data of ADU1 belonging to LCH1-3 becomes available to the MAC entity, LCH1-1 has contained available UL data of ADU1. If UL data of ADU1 belonging to LCH1-3 has higher priority or higher importance than UL data of ADU1 belonging to LCH1-1, then the trigger condition will be satisfied. According to some other embodiments of the present application, the trigger condition is satisfied in the case that: the UL data has higher priority or higher importance than that of any other available UL data belongs to any ADU in the LCG. Still taking UL data of ADU1 in FIG. 4 as an example, when UL data of ADU1 belonging to LCH1-3 becomes available to the MAC entity, LCH1-1 has contained available UL data of ADU1 and LCH1-2 has contained available UL data of ADU2. If UL data of ADU1 belonging to LCH1-3 has higher priority or importance than those available data belonging to LCH1-1 and LCH1-2, then the trigger condition will be satisfied. According to some yet other embodiments of the present application, the trigger condition is satisfied in the case that: the UL data has higher priority or higher importance than that of any other available UL data belongs to any ADU in any LCG. Still taking UL data of ADU1 in FIG. 4 as an example, when UL data of ADU1 belonging to LCH1-3 becomes available to the MAC entity, LCH1-1 has contained available UL data of ADU1, LCH1-2 has contained available UL data of ADU2 and LCH2-1 has contained available UL data of ADU3. If UL data of ADU1 belonging to LCH1-3 has higher priority or importance than those available data belonging to LCH1-1, LCH1-2 and LCH2-1, then the trigger condition will be satisfied. According to some yet other embodiments of the present application, the trigger condition is satisfied in the case that: the UL data has higher priority than a configured threshold associated with priority or has higher importance than a configured threshold associated with importance. Similarly, such an exemplary threshold associated with priority or an exemplary threshold associated with importance can be configured by RRC or MAC CE etc., higher layer signaling.

In some scenarios under Scheme 1, whether the trigger condition is satisfied is based on the priority of the ADU to which the UL data belongs. According to some embodiments of the present application, the trigger condition is satisfied in the case that: the ADU has higher priority than that of any ADU containing available UL data which belong to the LCG. Taking UL data of ADU2 in FIG. 4 as an example, when UL data of ADU2 belonging to LCH1-1 becomes available to the MAC entity, LCH1-1 has contained available UL data of ADU1. If ADU2 has higher priority than ADU1, then the trigger condition will be satisfied. According to some other embodiments of the present application, the trigger condition is satisfied in the case that: the ADU has higher priority than that of any ADU containing available UL data which belong to any LCG. Taking UL data of ADU2 in FIG. 4 as an example, when UL data of ADU2 belonging to LCH1-1 becomes available to the MAC entity, LCH1-1 has contained available UL data of ADU1 and LCH2-1 has contained available UL data of ADU3. If ADU2 has higher priority than ADU1 and ADU3, then the trigger condition will be satisfied. According to some yet other embodiments of the present application, the trigger condition is satisfied in the case that: the ADU has higher priority than a configured threshold associated with priority. Similarly, such an exemplary threshold associated with priority can be configured by RRC or MAC CE etc., higher layer signaling.

In some scenarios under Scheme 1, whether the trigger condition is satisfied is based on a configured threshold associated with buffer size. For example, the trigger condition is satisfied in the case that: data size of the UL data is larger than a configured threshold associated with buffer size. In another example, the trigger condition is satisfied in the case that: buffer size of the ADU that available to the MAC entity is larger than a configured threshold associated with buffer size. Similarly, in any case, such an exemplary threshold associated with buffer size can be configured by RRC or MAC CE etc., higher layer signaling.

In some embodiments of the present application, the UL data may be the first data of the ADU that becomes available to the MAC entity. According to some embodiments of the present application, the trigger condition is satisfied in the case that: none of logical channel(s) which belongs to the same LCG contains any available UL data for the ADU. Taking UL data of ADU1 in FIG. 4 as an example, if UL data of ADU1 becomes available to the MAC entity, and there is no LCH belonging to LCG #1 containing available UL data of ADU 1; then the trigger condition will be satisfied. According to some embodiments of the present application, the trigger condition is satisfied in the case that: none of logical channel(s) which belongs to the same LCG contains any available UL data. Still taking UL data of ADU1 in FIG. 4 as an example, if UL data of ADU1 becomes available to the MAC entity, and there is no LCH belonging to LCG #1 containing any available UL data; then the trigger condition will be satisfied.

In another example, in the case that LCG configuration is independent from ADU (i.e., under "Scheme 2"), various exemplary trigger conditions being satisfied are provided as follows under the premise that the UL data of an ADU (or UL data belonging to ADU), e.g., an IP packet belongs to the ADU becomes available to an MAC entity.

In some scenarios considering Scheme 2, similar to Scheme 1, whether the trigger condition is satisfied is based on the priority of the logical channel to which the UL data belongs. According to some embodiments of the present application, the trigger condition is satisfied in the case that: the logical channel has higher priority than that of any logical channel containing available UL data which belong to any ADU. Taking UL data belonging to ADU1 in FIG. 5 as an example, when UL data of ADU1 belonging to LCH1-2 becomes available to the MAC entity, LCH1-1 has contained available UL data of ADU1 and ADU 2, and LCH2-1 has contained available UL data of ADU1 and ADU3. If LCH1-2 has a higher priority than LCH1-1 and LCH2-1, then the trigger condition will be satisfied. According to some other embodiments of the present application, the trigger condition is satisfied in the case that: the logical channel has higher priority than that of any logical channel containing available UL data which belong to the ADU. Still taking UL data belonging to ADU1 in FIG. 5 as an example, when UL data of ADU1 belonging to LCH1-2 becomes available to the MAC entity, LCH1-1 and LCH2-1 have contained available UL data of ADU1. If LCH1-2 has a higher priority than LCH1-1 and LCH2-1, then the trigger condition will be satisfied. According to some other embodiments of the present application, the trigger condition is satisfied in the case that: the logical channel has higher priority than a configured threshold associated with priority. Such a threshold associated with priority can be configured by RRC or MAC CE etc., higher layer signaling.

In some scenarios considering Scheme 2, whether the trigger condition is satisfied is based on the priority or importance of the UL data belonging to the ADU itself, which is similar to Scheme 1. For example, according to some embodiments of the present application, the trigger condition is satisfied in the case that: the UL data has higher priority or higher importance than that of any other available UL data belongs to the ADU. Taking UL data belonging to ADU3 in FIG. 5 as an example, when UL data of ADU3 belonging to LCH2-1 becomes available to the MAC entity, LCH1-2 has contained available UL data of ADU3. If UL data of ADU3 belonging to LCH2-1 has a higher priority or importance than that belong to LCH1-2, then the trigger condition will be satisfied. According to some other embodiments of the present application, the trigger condition is satisfied in the case that: the UL data has higher priority or higher importance than that of any other available UL data belongs to any ADU. Taking UL data of ADU1 in FIG. 5 as an example, when UL data of ADU1 belonging to LCH1-2 becomes available to the MAC entity, LCH1-1 has contained available UL data of ADU1 and ADU2, LCH1-2 has contained available UL data of ADU4, and LCH2-1 has contained available UL data of ADU1 and ADU3. If UL data of ADU1 belonging to LCH1-2 has higher priority or importance than those available data belonging to LCH1-1, LCH1-2 and LCH2-1, then the trigger condition will be satisfied. According to some other embodiments of the present application, similar to Scheme 1, the trigger condition is satisfied in the case that: the UL data has higher priority than a configured threshold associated with priority or has higher importance than a configured threshold associated with importance.

In some scenarios under Scheme 2, whether the trigger condition is satisfied is based on the priority of the ADU to which the UL data belongs, which is also similar to Scheme 1. For example, the trigger condition is satisfied in the case that: the ADU has higher priority than that of any ADU containing available UL data. Taking UL data belonging to ADU2 in FIG. 5 as an example, when UL data of ADU2 belonging to LCH1-1 becomes available to the MAC entity, LCH1-1 has contained available UL data of ADU1. If ADU2 has higher priority than ADU1, then the trigger condition is satisfied. In another example, the trigger condition is satisfied in the case that: the ADU has higher priority than a configured threshold associated with priority.

Similar to Scheme 1, whether the trigger condition is satisfied is also determined based on a configured threshold associated with buffer size in some scenarios under Scheme 2. For example, the trigger condition is satisfied in the case that: data size of the UL data or buffer size of the ADU available to the MAC entity is larger than a configured threshold associated with buffer size.

In some embodiments of the present application, the UL data may be the first data of the ADU that becomes available to the MAC entity under Scheme 2. Similarly, the trigger condition is satisfied in the case that: none of logical channel(s) which belongs to the ADU contains any available UL data of the ADU, or none of logical channel(s) contains any available UL data.

In yet another example, the trigger condition is associated with a timer associated with an ADU (Scheme 3), which does not consider the relationship between ADU and LCG configuration. According to some embodiments of the present application, the trigger condition is satisfied in the case that a timer associated with the ADU expires and no BSR contains left data in a buffer of the ADU. Length of the timer may be configured by network side or is set based on the delay budget of the ADU. The timer may be started in response to that first data of the ADU becomes available to an MAC entity, and may be stopped in response to that last data of the ADU has been transmitted. Accordingly, such a timer can avoid that transmission delay for the whole ADU is too large or larger than the packet delay budget (PDB) of the ADU if configured.

Figures 6, 7:
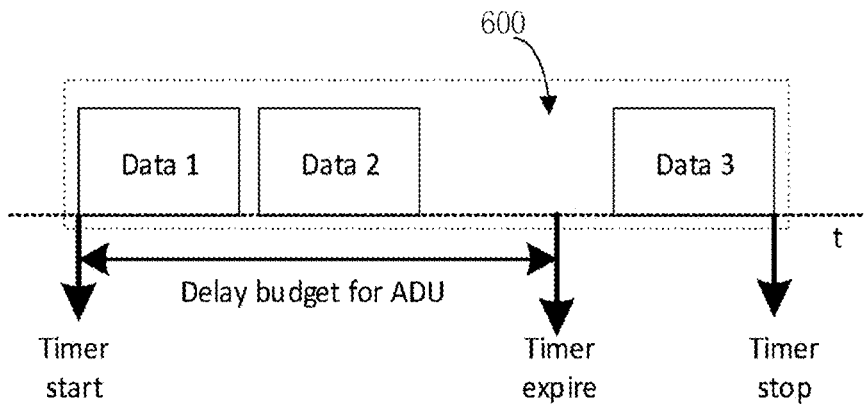
FIG. 6 illustrates a schematic diagram of exemplary procedure of reporting buffer status under Scheme 3 according to some embodiments of the present application.
FIG. 7 illustrates an exemplary format of BSR MAC CE for BSR per LCG according to some embodiments of the present application.

FIG. 6 illustrates a schematic diagram of exemplary procedure of reporting buffer status under Scheme 3 according to some embodiments of the present application.

Referring to FIG. 6, the whole data of an ADU 600 include Data 1, Data 2, and Data 3. A timer associated with the ADU 600 is set. It is supposed that the timer is started when the first data of the ADU 600, i.e., Data 1 becomes available to the MAC entity, and is stopped after last data of the ADU, i.e., Data 3 is transmitted. However, the length of the timer is set based on the delay budget of the ADU 600. The timer will expire after a time length equal to the delay budget. Thus, even if last data, i.e., Data 3 has not been transmitted, a BSR will be triggered in response to the expiry of the timer.

Returning to FIG. 3, in step 303, buffer status information for the triggered BSR will be generated. The trigger BSR is a legacy BSR or an ADU associated BSR containing ADU buffer status information. For example, the BSR triggered under Scheme 1 and Scheme 2 is an ADU associated BSR containing ADU buffer status information, while the BSR triggered under Scheme 3 is an ADU associated BSR containing ADU buffer status information or a legacy BSR without ADU buffer status information.

When an ADU associated BSR containing ADU buffer status information is triggered, data volume of the ADU will be calculated to generate the buffer status information of the ADU, e.g., in RLC layer, PDCP layer and MAC layer. For example, UE may consider the following as RLC data volume for a specific ADU: RLC service data units (SDU) s and RLC SDU segments of the ADU that have not yet been included in an RLC data PDU, RLC data PDUs of the ADU that are pending for initial transmission, and RLC data PDUs of the ADU that are pending for retransmission (RLC acknowledge mode (AM)). The transmitting PDCP entity may consider the following as PDCP data volume for the specific ADU: the PDCP SDUs of the ADU for which no PDCP Data PDUs have been constructed; the PDCP data PDUs of the ADU that have not been submitted to lower layers; and for AM DRBs, the PDCP SDUs of the ADU to be retransmitted; and for AM DRBs, the PDCP Data PDUs of the ADU to be retransmitted. In MAC layer, in the case that data for the ADU are mapped to a plurality of logical channels, the data volume of the ADU are calculated based on the plurality of logical channels, e.g., the sum of data volume of the plurality of logical channels calculated for the same ADU in RLC layer and PDCP layer.

In addition, legacy BSR MAC CE cannot be used for transmission of an ADU associated BSR containing ADU buffer status information, and thus a novel BSR MAC CE for transmission of such a BSR is needed. In some embodiments of the present application, BSR MAC CE for transmission of the ADU associated BSR is separate from that for transmission of a legacy BSR.

In some embodiments of the present application, the BSR may contain ADU buffer status information based on each of at least one of LCG, i.e., BSR per LCG, which is applicable for an ADU associated BSR triggered under Scheme 1 or the like (e.g., although under Scheme 3, data of an ADU are mapped to the same LCG). Buffer status information of the one or more ADUs of each LCG is included in the BSR MAC CE, or only buffer status information of the ADU that triggers the BSR is included in BSR MAC CE. In other words, under Scheme 1 or the like, for each LCG, there may be one or more ADUs. If an ADU associated BSR triggered, the buffer status information of the corresponding ADU will be included in the BSR to be reported. One or more ADU buffer sizes can be included in the same BSR MAC CE. However, if only one ADU buffer size is included, the buffer status information of the ADU triggering the BSR will be included in the BSR MAC CE.

To differentiate buffer status information of different ADUs, index of each corresponding ADU will also be included in the BSR MAC CE. For example, an ADU index may be multiple bits, e.g., 3 bits for differentiating 8 different ADUs in one LCG under simultaneous transmission. For the 8 different ADUs, UE may set the ADU index value from 0 to 7 in an ascending order.

In some embodiments of the present application, index of each LCG associated with each ADU whose buffer status information is included in the BSR MAC CE is also included the BSR MAC CE to distinguish different LCGs.

Figure 8:
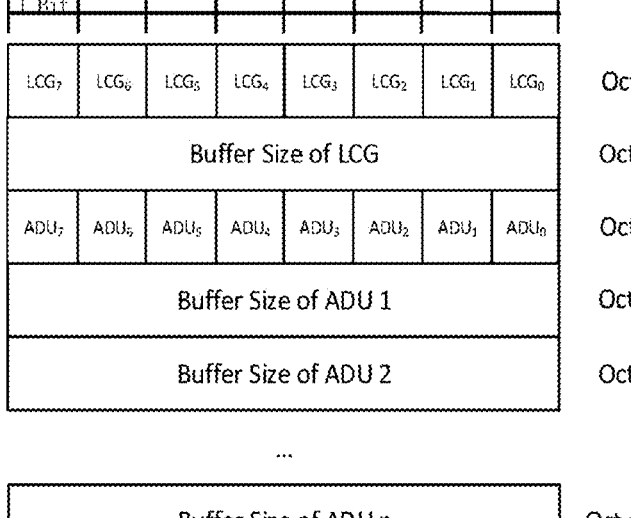
FIG. 8 illustrates an exemplary format of BSR MAC CE for BSR per LCG according to some other embodiments of the present application.
Figure 9:
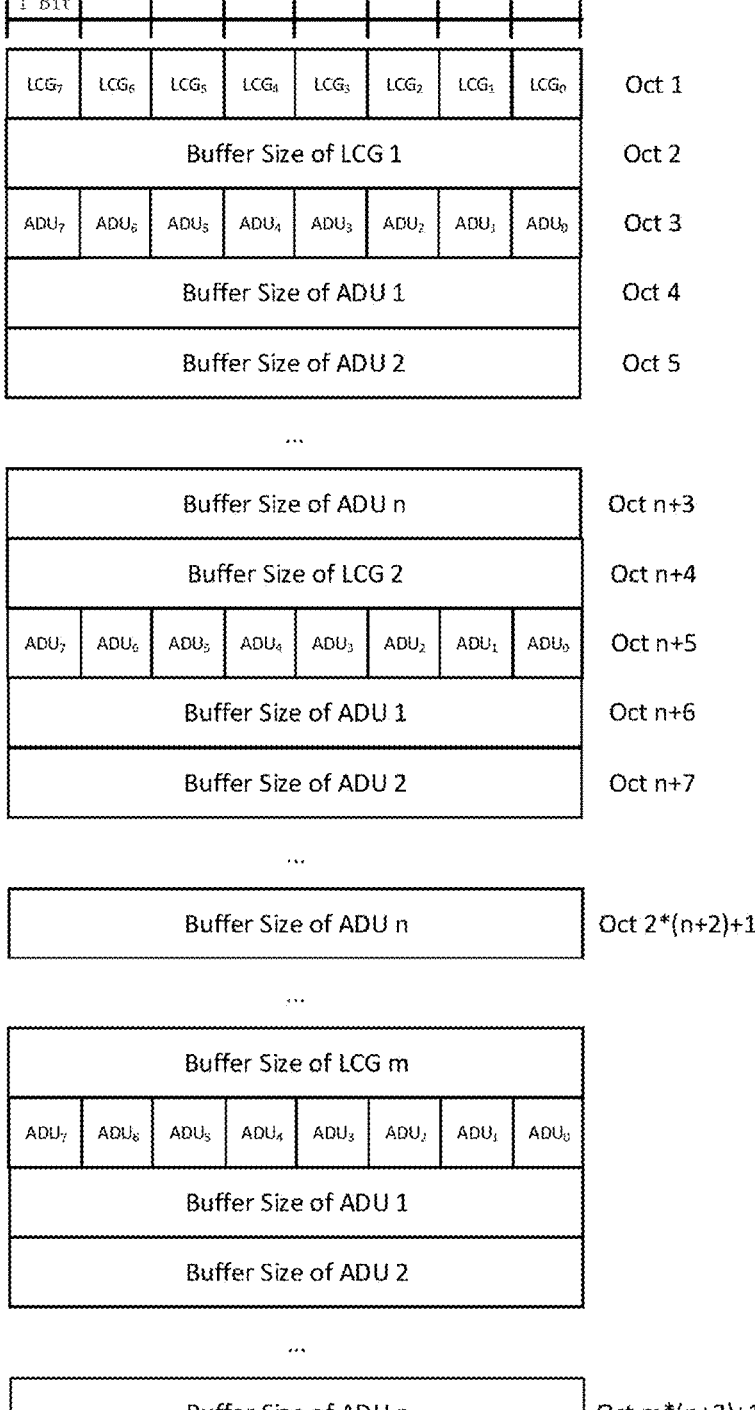
FIG. 9 illustrates an exemplary format of BSR MAC CE for BSR per LCG according to some yet other embodiments of the present application.

Some exemplary formats of BSR MAC CE for transmission of BSR per LCG are illustrated in FIGS. 7, 8 and 9.

FIG. 7 illustrates an exemplary format of BSR MAC CE for BSR per LCG according to some embodiments of the present application. As shown in FIG. 7, there is one "ADU Index," one "LCG ID" (identity, or index) to which the ADU is mapped, and "Buffer Size of ADU" and "Buffer Size of LCG." That is, only one ADU buffer size, i.e., the buffer size of the ADU triggering the BSR is included in the BSR MAC CE (or only buffer status of the only one ADU is reported via the BSR MAC CE). Such a format of BSR MAC CE is also referred to a short BSR MAC CE format.

FIG. 8 illustrates an exemplary format of BSR MAC CE for BSR per LCG according to some other embodiments of the present application. As shown in FIG. 8, multiple ADU buffer sizes (or buffer status of multiple ADUs), e.g., "Buffer size of ADU1" and "Buffer size of ADU2" etc., are included for one LCG. LCG index bits, e.g., $LCG_1$, $LCG_2$, etc., indicate for which LCG "Buffer Size of LCG" is. ADU index bits, e.g., $ADU_1$, $ADU_2$, etc., indicate how many AUDs and of which ADU each buffer status are reported.

FIG. 9 illustrates an exemplary format of BSR MAC CE for BSR per LCG according to some yet other embodiments of the present application. As shown in FIG. 9, buffer statuses of ADUs of multiple LCG are included in the BSR MAC CE, which is also referred to as a long BSR MAC CE format. Buffer sizes of ADUs of each LCG are included in the manner similar to that shown FIG. 8, and thus will not repeat herein.

In some embodiments of the present application, the BSR is an ADU associated BSR containing ADU buffer status information based on an ADU, i.e., BSR per ADU, which is applicable for Scheme 2 or the like (e.g., although under Scheme 3, LCG configuration is independent from ADU). Only buffer status information of the ADU triggering the BSR is included in BSR MAC CE or buffer status information of more than one ADU is included in BSR MAC CE. To differentiate buffer status information of different ADUs, index of each corresponding ADU will also be included in the BSR MAC CE. For example, an ADU index may be multiple bits, e.g., 3 bits for differentiating 8 different ADUs in one LCG under simultaneous transmission. BSR per LCG and BSR per ADU are separated reported in some embodiments of the present application, that is, not being included in the same BSR MAC CE.

Figure 10:
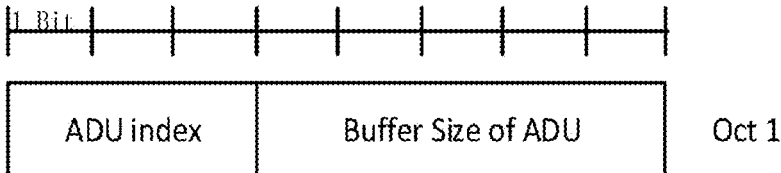
FIG. 10 illustrates an exemplary format of BSR MAC CE for BSR per ADU according to some embodiments of the present application.
Figure 11:
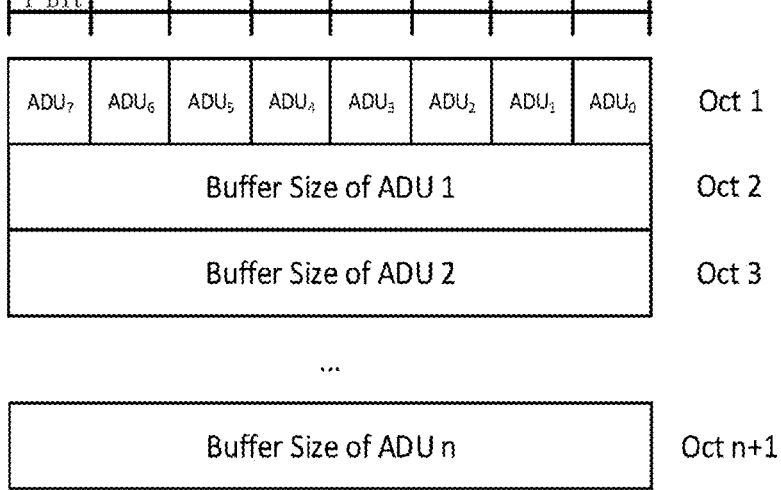
FIG. 11 illustrates an exemplary format of BSR MAC CE for BSR per ADU according to some other embodiments of the present application.

Some exemplary formats of BSR MAC CE for transmission of BSR per ADU are illustrated in FIGS. 10 and 11.

FIG. 10 illustrates an exemplary format of BSR MAC CE for BSR per ADU according to some embodiments of the present application. As shown in FIG. 10, there is one "ADU Index," and "Buffer Size of ADU." That is, only one ADU buffer size, i.e., the buffer size of the ADU triggering the BSR is included in the BSR MAC CE (or only buffer status of the only one ADU is reported via the BSR MAC CE). Similarly, such a format of BSR MAC CE is also referred to a short BSR MAC CE format.

FIG. 11 illustrates an exemplary format of BSR MAC CE for BSR per ADU according to some other embodiments of the present application. As shown in FIG. 11, multiple ADU buffer sizes (or buffer status of multiple ADUs), e.g., "Buffer size of ADU1" and "Buffer size of ADU2" etc., are included in the same BSR MAC CE. ADU index bits, e.g., ADU1, ADU2, etc., indicate how many ADUs and of which ADU each buffer status is reported. Similarly, such a format of BSR MAC CE is also referred to a long BSR MAC CE format.

Besides methods of reporting buffer status, some embodiments of the present application also provide an apparatus of reporting buffer status.

Figure 12:
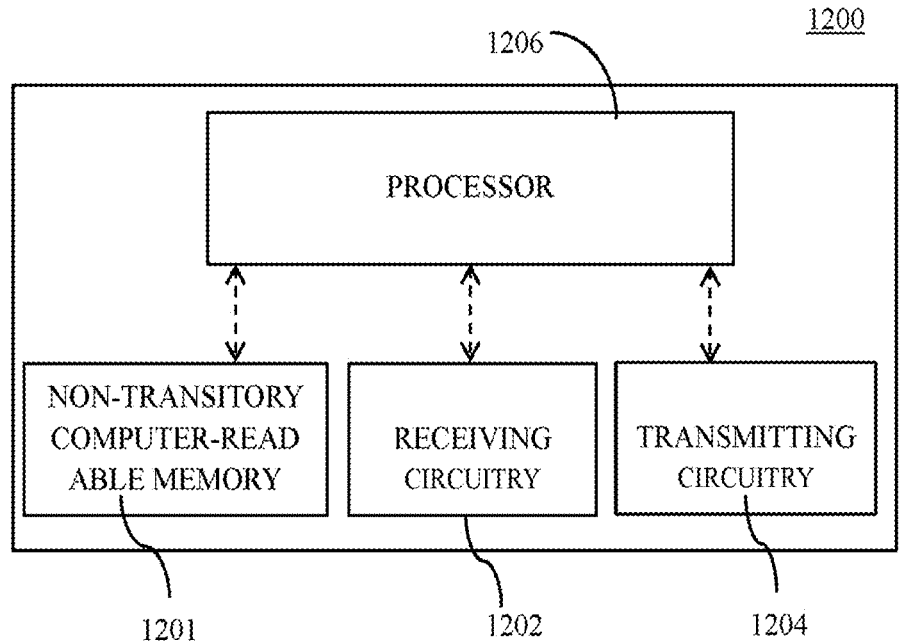
FIG. 12 illustrates a block diagram of an apparatus of unicast establishment according to some embodiments of the present application.

For example, FIG. 12 illustrates a block diagram of an apparatus of reporting buffer status 1200 according to some embodiments of the present application.

As shown in FIG. 12, the apparatus 1200 may include at least one non-transitory computer-readable medium 1201, at least one receiving circuitry 1202, at least one transmitting circuitry 1204, and at least one processor 1206 coupled to the non-transitory computer-readable medium 1201, the receiving circuitry 1202 and the transmitting circuitry 1204. The at least one processor 1206 may be a CPU, a DSP, a microprocessor etc. The apparatus 1200 may be a UE configured to perform a method illustrated in the above or the like.

Although in this figure, elements such as the at least one processor 1206, transmitting circuitry 1204, and receiving circuitry 1202 are described in the singular, the plural is contemplated unless a limitation to the singular is explicitly stated. In some embodiments of the present application, the receiving circuitry 1202 and the transmitting circuitry 1204 can be combined into a single device, such as a transceiver. In certain embodiments of the present application, the apparatus 1200 may further include an input device, a memory, and/or other components.

In some embodiments of the present application, the non-transitory computer-readable medium 1201 may have stored thereon computer-executable instructions to cause a processor to implement the method with respect to the UE as described above. For example, the computer-executable instructions, when executed, cause the processor 1206 interacting with receiving circuitry 1202 and transmitting circuitry 1204, so as to perform the steps with respect to the UE as depicted above.

Figure 13:
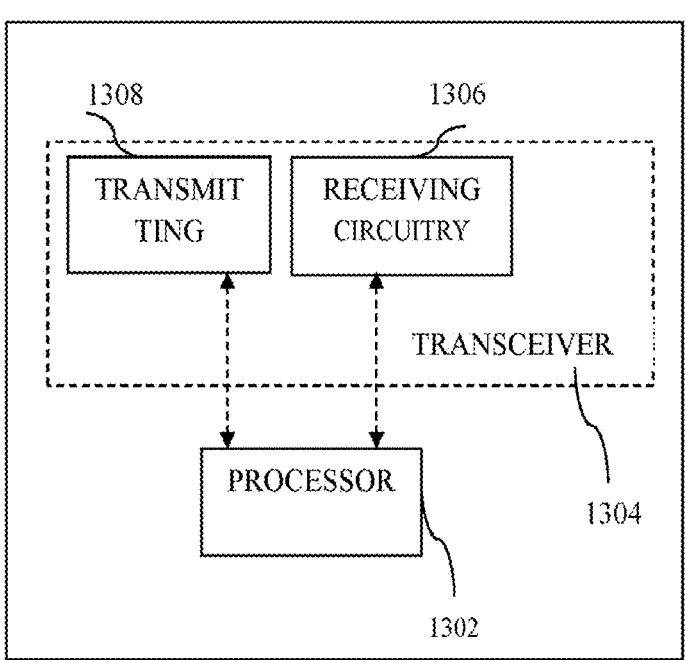
FIG. 13 illustrates a block diagram of an apparatus of unicast establishment according to some other embodiments of the present application.

FIG. 13 is a block diagram of an apparatus of reporting buffer status according to some other embodiments of the present application.

Referring to FIG. 13, the apparatus 1300, for example a UE may include at least one processor 1302 and at least one transceiver 1304 coupled to the at least one processor 1302. The transceiver 1304 may include at least one separate receiving circuitry 1306 and transmitting circuitry 1308, or at least one integrated receiving circuitry 1306 and transmitting circuitry 1308. The at least one processor 1302 may be a CPU, a DSP, a microprocessor etc.

According to some embodiments of the present application, when the apparatus 1300 is a UE, the processor is configured to: trigger a BSR in response to a trigger condition associated with an ADU being satisfied; and generate buffer status information for the BSR.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device capable of implementing the flowcharts shown in the figures may be used to implement the processor functions of this application. For example, an embodiment of the present application provides an apparatus, including a processor and a memory. computer programmable instructions for implementing a method are stored in the memory, and the processor is configured to perform the computer programmable instruc- tions to implement the method. The method may be a method as stated above or other method according to an embodiment of the present application.

An alternative embodiment preferably implements the methods according to embodiments of the present applica- tion in a non-transitory, computer-readable storage medium storing computer programmable instructions. The instruc- tions are preferably executed by computer-executable com- ponents preferably integrated with a network security sys- tem. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hard- ware device. For example, an embodiment of the present application provides a non-transitory, computer-readable storage medium having computer programmable instruc- tions stored therein. The computer programmable instruc- tions are configured to implement a method as stated above or other method according to an embodiment of the present application.

In addition, in this disclosure, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed:

1. A user equipment (UE), comprising:
at least one memory; and
at least one processor coupled with the at least one memory and configured to cause the UE to:
trigger a buffer status report (BSR) in response to a trigger condition associated with an application data unit (ADU) being satisfied; and
generate ADU buffer status information for the BSR, wherein the ADU buffer status information includes, for the ADU, information indicating an amount of data of the ADU available for transmission.

2. The UE of claim 1, wherein data of the ADU is configured to a logic channel group (LCG), and the ADU is associated with at least one logical channel of the LCG.

3. The UE of claim 2, wherein the trigger condition is satisfied if uplink (UL) data of the ADU becomes available to a media access control (MAC) entity and at least one of:
the UL data belongs to a logical channel with a higher priority than that of any other logical channel contain- ing available UL data in the LCG or in any LCG;
the UL data belongs to the logical channel with the higher priority than a configured priority threshold;
the UL data has the higher priority or a higher importance than that of any other available UL data in the LCG or in any LCG;

the UL data or the ADU has the higher priority than the configured priority threshold;
the UL data has the higher importance than a configured importance threshold;
the ADU has the higher priority than that of any ADU containing the available UL data in the LCG or in any LCG;
a data size of the UL data is larger than a configured buffer size threshold; or
a buffer size of the ADU available to the MAC entity is larger than a configured buffer size threshold.

4. The UE of claim 2, wherein the trigger condition is satisfied if uplink (UL) data of the ADU becomes available to a media access control (MAC) entity and at least one of:
no logical channels of the LCG contain any available UL data for the ADU, or
none of the logical channels of the LCG contain any of the available UL data.

5. The UE of claim 1, wherein a logic channel group (LCG) configuration is independent from the ADU.

6. The UE of claim 5, wherein uplink (UL) data of the ADU is associated with a logical channel, and wherein the trigger condition is satisfied if the UL data becomes avail- able to a media access control (MAC) entity and at least one of:
the logical channel has a higher priority than that of any logical channel containing available UL data of any ADU including the ADU;
the logical channel has the higher priority than a config- ured priority threshold;
the UL data has the higher priority or a higher importance than that of any other available UL data of any ADU including the ADU;
the UL data or the ADU has the higher priority than the configured priority threshold;
the UL data has the higher importance than a configured importance threshold;
the ADU has the higher priority than that of any ADU containing the available UL data;
a data size of the UL data is larger than a configured buffer size threshold; or
a buffer size of the ADU available to the MAC entity is larger than the configured buffer size threshold.

7. The UE of claim 5, wherein the trigger condition is satisfied if uplink (UL) data of the ADU, associated with a logical channel, becomes available to a media access control (MAC) entity and at least one of:
no logical channels of the ADU contain any available UL data of the ADU, or
none of the logical channels contain any of the available UL data.

8. The UE of claim 1, wherein:
the trigger condition is satisfied if a timer associated with the ADU expires and no BSR contains remaining data in a buffer of the ADU, and
a duration of the timer is configured by a network or is set based at least in part on a delay budget of the ADU.

9. The UE of claim 8, wherein:
the timer is started in response to a first portion of data of the ADU becoming available to a media access control (MAC) entity, and
the timer is stopped in response to a last portion of data of the ADU having been transmitted.

10. The UE of claim 1, wherein;
the ADU buffer status information is based at least in part on at least one logical channel group (LCG), and one or more ADUs are associated with each LCG of the at least one LCG, and the ADU buffer status information is included in a BSR media access control (MAC) control element (CE) for transmission of the BSR.

11. The UE of claim 1, wherein the at least one processor is further configured to cause the UE to transmit the ADU buffer status information in a BSR media access control (MAC) control element (CE).

12. The UE of claim 1, wherein the at least one processor is further configured to cause the UE to transmit the ADU buffer status information for one or more ADUs including the ADU in a BSR media access control (MAC) control element (CE), wherein the BSR MAC CE includes a respective ADU index for each of the one or more ADUs.

13. The UE of claim 1, wherein the at least one processor is configured to cause the UE to calculate, in a radio link control (RLC) layer and a packet data convergence protocol (PDCP) layer, a data volume for the ADU, wherein:

the buffer status information is generated based at least in part on the data volume, data for the ADU is mapped to a plurality of logical channels in a media access control (MAC) layer, and the data volume of the ADU is calculated based at least in part on the plurality of logical channels.

14. A method performed by a user equipment (UE), the method comprising:

triggering a buffer status report (BSR) in response to a trigger condition associated with an application data unit (ADU) being satisfied; and generating ADU buffer status information for the BSR, wherein the ADU buffer status information includes, for the ADU, information indicating an amount of data of the ADU available for transmission.

15. The method of claim 14, wherein data of the ADU is configured to a logic channel group (LCG), and the ADU is associated with at least one logical channel of the LCG.

16. The method of claim 15, wherein the trigger condition is satisfied if uplink (UL) data of the ADU becomes available to a media access control (MAC) entity and at least one of:

no logical channels of the LCG contain any available UL data for the ADU, or none of the logical channels of the LCG contain any of the available UL data.

17. The method of claim 14, wherein a logic channel group (LCG) configuration is independent from the ADU.

18. The method of claim 17, wherein the trigger condition is satisfied if uplink (UL) data of the ADU, associated with a logical channel, becomes available to a media access control (MAC) entity and at least one of:

no logical channels of the ADU contain any available UL data of the ADU, or none of the logical channels contain any of the available UL data.

19. The method of claim 14, wherein:

the trigger condition is satisfied if a timer associated with the ADU expires and no BSR contains remaining data in a buffer of the ADU, and a duration of the timer is configured by a network or is set based at least in part on a delay budget of the ADU.

20. A processor for wireless communication, comprising:

at least one controller coupled with at least one memory and configured to cause the processor to:

trigger a buffer status report (BSR) in response to a trigger condition associated with an application data unit (ADU) being satisfied; and generate ADU buffer status information for the BSR, wherein the ADU buffer status information includes, for the ADU, information indicating an amount of data of the ADU available for transmission.

* * * * *